United States Patent
Gebert et al.

(10) Patent No.: US 9,056,546 B2
(45) Date of Patent: Jun. 16, 2015

(54) TANK FOR A MOTOR VEHICLE, IN PARTICULAR FUEL OR AUXILIARY FLUID TANK FOR A MOTOR VEHICLE, AND METHOD FOR PRODUCING SUCH A TANK

(71) Applicant: Kautex Textron GmbH & Co. KG, Bonn (DE)

(72) Inventors: Klaus Gebert, Willich (DE); Jochen Hild, Bonn (DE); Markus Hutzen, Sankt Augustin (DE); Christoph Mehren, Konigswinter (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/357,435

(22) PCT Filed: Oct. 4, 2012

(86) PCT No.: PCT/EP2012/004146
§ 371 (c)(1),
(2) Date: May 9, 2014

(87) PCT Pub. No.: WO2013/068064
PCT Pub. Date: May 16, 2013

(65) Prior Publication Data
US 2014/0305936 A1 Oct. 16, 2014

(30) Foreign Application Priority Data

Nov. 9, 2011 (DE) .......................... 10 2011 117 999

(51) Int. Cl.
*B60K 15/03* (2006.01)
*B29C 65/00* (2006.01)
(Continued)

(52) U.S. Cl.
CPC . *B60K 15/03006* (2013.01); *B60K 2015/03467* (2013.01); *B29C 66/54* (2013.01);
(Continued)

(58) Field of Classification Search
CPC ................... B60K 15/03006; B60K 15/03177; B60K 15/03; B29L 2031/7172
USPC ...................... 220/4.14, 4.13, 4.12, 562, 4.16; 156/245
See application file for complete search history.

(56) References Cited

U.S. PATENT DOCUMENTS 6,338,420 B1 * 1/2002 Pachciarz et al. ............. 220/562
2002/0053567 A1 * 5/2002 Beyer et al. .................. 220/4.14
(Continued)

FOREIGN PATENT DOCUMENTS

DE 102006031902 A1 1/2008

OTHER PUBLICATIONS

English language PCT Search Report and Written Opinion mailed Jan. 30, 2013, received in corresponding PCT Application No. PCT/EP12/04146, 7 pgs.

*Primary Examiner* — Robert J Hicks
(74) *Attorney, Agent, or Firm* — Grossman Tucker Perreault & Pfleger, PLLC

(57) ABSTRACT

The invention relates to a fuel tank for a motor vehicle, which is made up of two shells which are complementary to one another, wherein the shells are supported against one another by at least one strut penetrating the tank (1), connecting opposing wall regions of the tank. The strut is configured as a two-part hollow strut (4), wherein the parts of the hollow strut are latched together via a plug connection and the latching connection is secured by at least one closure body (12) at least partially filling up the cross section of the hollow strut (4) at least level with the latching connection.

15 Claims, 2 Drawing Sheets

(51) Int. Cl.
    *B29C 65/56*     (2006.01)
    *B29C 65/02*     (2006.01)
    *B29C 51/12*     (2006.01)
    *B29C 65/60*     (2006.01)
    *B29C 49/04*     (2006.01)
    *B29C 51/26*     (2006.01)
    *B29C 49/20*     (2006.01)

(52) U.S. Cl.
    CPC .......... *B29C 51/12* (2013.01); *B60K 15/03177* (2013.01); *B29C 65/565* (2013.01); *B29C 65/60* (2013.01); *B29C 66/53245* (2013.01); *B29C 66/61* (2013.01); *B29C 66/73921* (2013.01); *B29C 65/028* (2013.01); *B29C 49/04* (2013.01); *B29C 51/267* (2013.01); *B29C 2049/2013* (2013.01); *B29C 66/543* (2013.01)

(56) References Cited

U.S. PATENT DOCUMENTS

2005/0121517 A1*   6/2005   Igval et al. .................... 235/385
2012/0138606 A1    6/2012   Varga

* cited by examiner

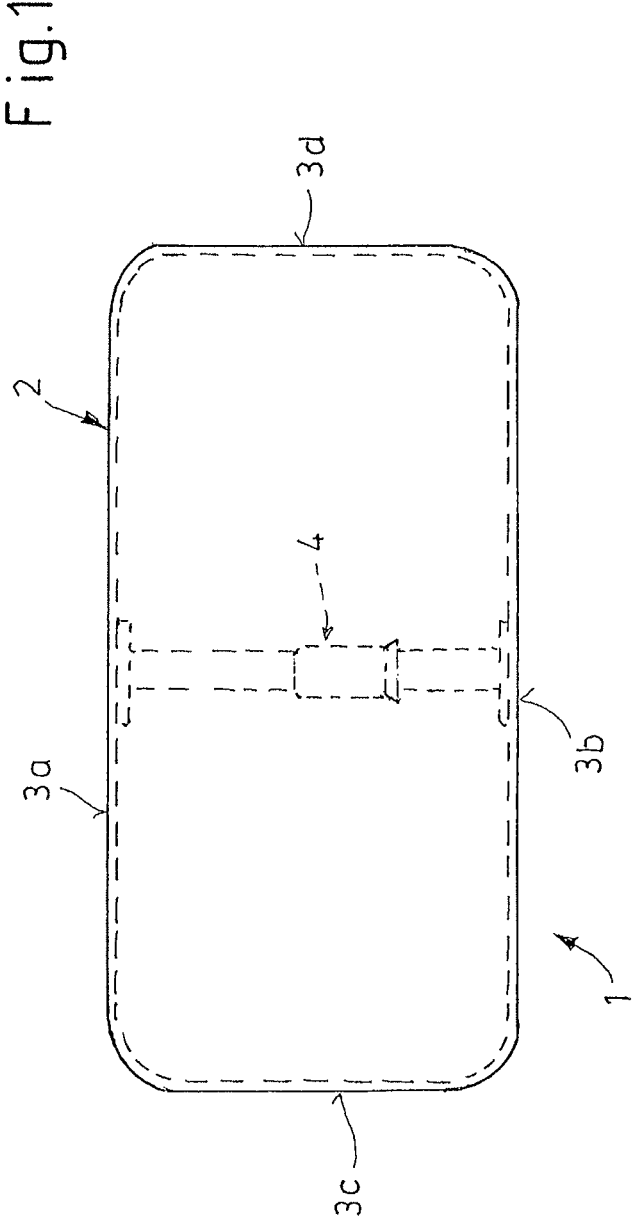

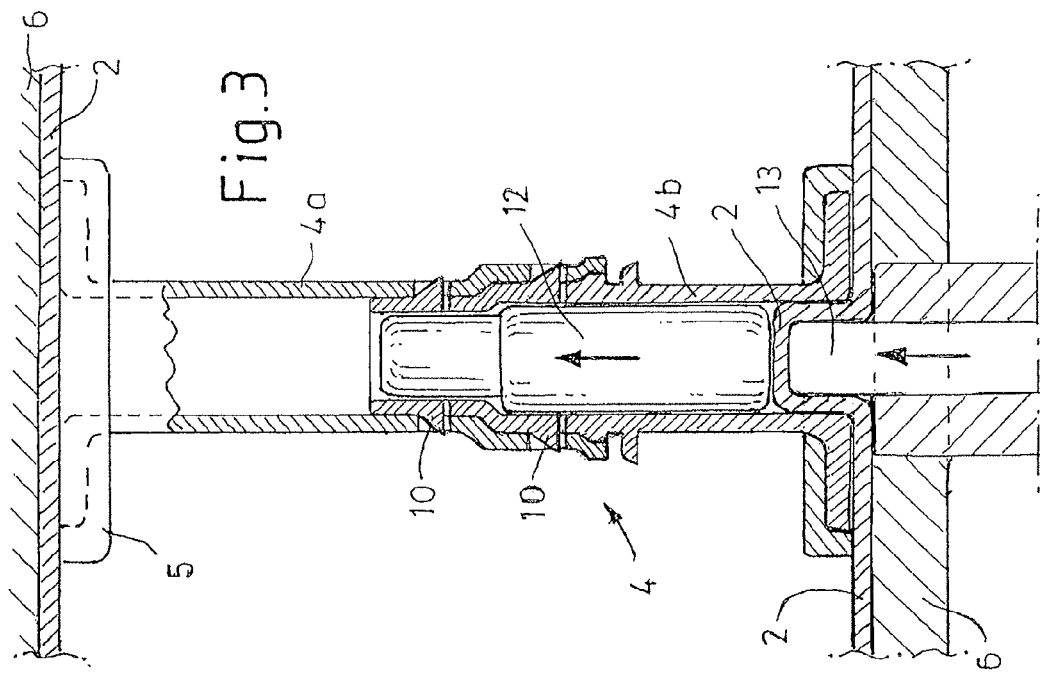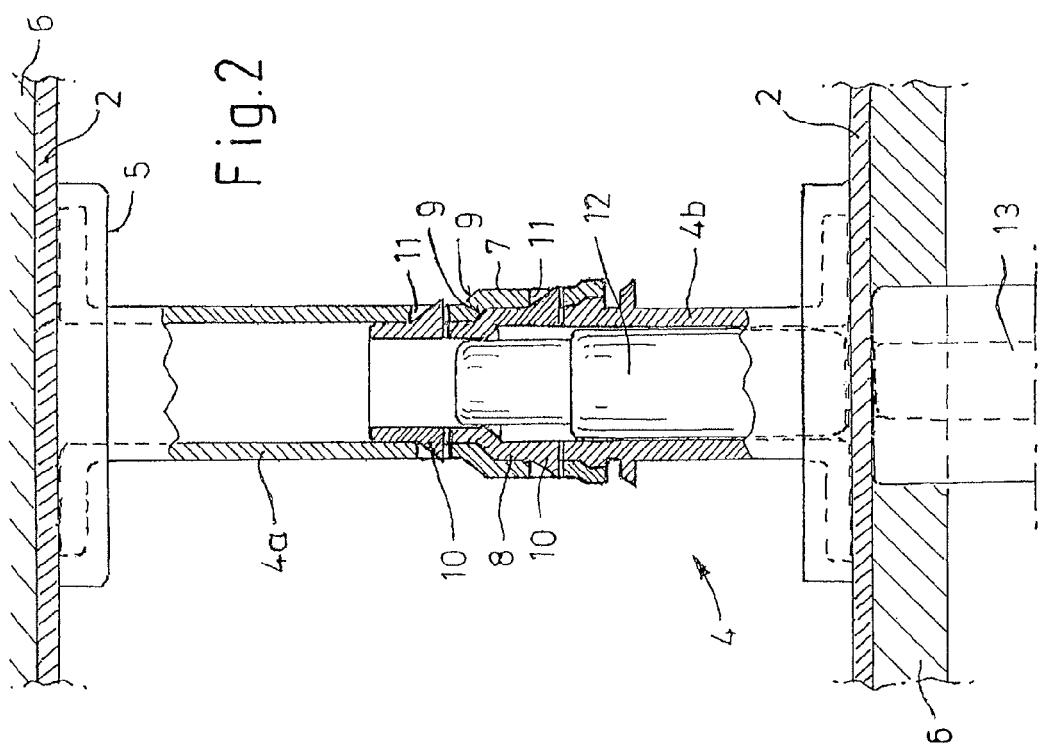

TANK FOR A MOTOR VEHICLE, IN PARTICULAR FUEL OR AUXILIARY FLUID TANK FOR A MOTOR VEHICLE, AND METHOD FOR PRODUCING SUCH A TANK

The invention relates to a tank for a motor vehicle, in particular a fuel or auxiliary fluid tank for a motor vehicle, which is made up of two shells which are complementary to one another, wherein the shells are supported against one another by at least one strut penetrating the tank and connecting opposing wall regions of the tank.

Such a tank is, for example, disclosed in DE 10 2006 031 902 A. DE 10 2006 031 902 A relates to a method for producing hollow bodies made of thermoplastic material, in which web-shaped or sheet-like preforms made of plasticized plastics material are molded in a multi-part die forming a mold cavity, by stretching and applying the preforms against the inner contour of the mold cavity, wherein the method initially comprises the formation of two intermediate products in the form of shells, which are complementary to one another, and in each case parts of strut elements are fastened to the respective inner faces of the shells facing one another in the installed position. The strut elements of shells which are complementary to one another are in each case formed in a complementary manner to one another in the sense that they are combined to form a strut which is joined together, reinforcing the tank. The shells are joined together so that the parts complementary to one another of the strut engage in one another. The parts of the struts form a tie rod which consists of a latching pin and a sleeve-shaped latching receiver. The two strut parts are positioned relative to one another, during production of the hollow body, on the respective inner wall of the shells such that said shells are arranged exactly opposite one another. Then the shells are joined and welded together in the die, wherein the latching pin of a part of the strut engages in the associated latching receiver of a different part of the strut and is latched to a tie rod. In this manner, the opposing walls of the finished tank are braced together almost unreleasably.

In particular, fuel tanks are generally designed for the fittings to remain therein for the life of the tank. This means that the finished tank comprising the functional components arranged therein, such as for example the filling level sensors, fuel pumps, venting valves and the like, is designed to be maintenance-free for the entire life of the motor vehicle. This also relates to other auxiliary fluid tanks on motor vehicles.

During the life of such a tank, said tank is subjected to internal pressure fluctuations to a greater or lesser extent, on the one hand due to temperature changes and/or surging fuel and, on the other hand, caused by the surging movements inside the tank due to the driving dynamics. Finally, parts are arranged inside the tank, in particular when they consist of thermoplastic material which is continuously subject to the action of fuel, which may lead to swelling, warpage and deformation depending on the material composition, for example in the case of plastics based on HDPE. Potentially, such swelling and deformation may impair the positive connection of the latching connections or snap connections. Whether a latching connection holds over the entire life of the tank, under all conceivable load conditions, in theory may only be determined by complicated tests over the long term, as the interior of the tank is generally no longer accessible after the manufacture thereof.

The object of the invention, therefore, is to improve a fuel tank with a wall-to-wall strut and/or wall-to-wall support of the type mentioned in the introduction, with regard to the mechanical load-bearing capacity.

The object is achieved by a tank for a motor vehicle, in particular a fuel tank or auxiliary fluid tank for a motor vehicle, which is made up of two shells which are complementary to one another, wherein the shells are supported against one another by at least one strut penetrating the tank, connecting opposing wall regions of the tank, wherein the strut is configured as a hollow strut, the hollow strut being configured in two parts, the parts of the hollow strut being latched together via a plug connection and the latching connection being secured by at least one closure body.

The invention may be summarized in that said invention makes use of the concept of the two-part tie rod with the latching of the parts of the tie rod during the production of the tank, and secures the "blind" latching produced during the production of the tank by means of a closure body, so that the conventional latching lock is not able to be unlocked during operation and/or fail during operation in the event of a change in the tension and/or pressure in the tank or due to swelling, warpage and deformation of the latching hooks.

The closure body may, for example, at least partially fill up the cross section of the hollow strut, at least level with the latching connection.

Alternatively, the closure body may be configured as a ring, which encompasses the hollow strut from outside and secures the latching, for example by the ring in the secured position engaging below one or more latching springs in the extended position.

The use of multi-part tie rods, which are completed during the joining process of the shells of the tank, has the advantage relative to conventional wall-to-wall welds of the tank or one-piece tie rods that for said tie rods a smaller loss in volume has to be taken into account in the tank.

In a preferred variant of the tank according to the invention, it is provided that the shells and the hollow strut consist of thermoplastic material. Preferably a thermoplastic material may be used. The shells and the hollow strut may consist of plastics based on HDPE.

If the connection of the hollow strut is secured in the above-described manner, the resistance of the material used for the hollow strut relative to fuels and/or alcohol or other chemicals is able to play a less important role.

Expediently, the parts of the hollow strut are welded and/or riveted in each case to the wall of the associated shell. The term "welding" in the sense of the present application is understood as a connection of compatible plastics materials to one another by using pressure and heat. Additionally, the parts of the hollow strut may be riveted in each case to the inner wall of the shells. This riveting may, for example, be implemented as so-called "in situ" riveting which means that, for example when attaching or inserting a hollow strut into a shell, hot-melt material of the shell flows through and engages behind bores or through-holes in a base of the hollow strut.

In a particularly advantageous variant of the tank according to the invention, it is provided that the parts of the hollow strut have a sleeve end and a plug end which are latched into one another and/or able to be latched into one another. In other words, part of a hollow strut is provided with a sleeve end and the part complementary thereto of the hollow strut is provided with a plug end.

Expediently, at least one latching spring is provided on the plug end, said latching spring engaging in a correspondingly configured latching recess of the sleeve end. Naturally, a plurality of latching springs distributed over the periphery may be provided on the plug end, said latching springs in each case cooperating with an associated latching recess of the sleeve end.

The closure body in its closed position preferably holds the latching spring in an extended position, in which the latching spring engages in an associated latching recess.

The closure body may, for example, be configured as a cylinder which engages behind the latching connection in a locked position. Such a cylinder may, for example, be displaceably arranged in one of the hollow struts, preferably in that with the plug end. If the cylinder is moved into a position engaging behind the latching springs, it is no longer possible to deflect the latching springs and the latching connection is thus secured unreleasably.

The hollow strut and the closure body do not necessarily have to be cylindrical, instead other square or polygonal contours are also conceivable.

The above-mentioned object is also achieved by a method for producing a tank of the type described above, which is characterized by the following method steps:

producing two shells which are complementary to one another from thermoplastic material, introducing fittings in the form of hollow support elements into the shells such that in each case said hollow support elements are connected by a material and/or positive connection to the shells, wherein the support elements in each case have complementary plug ends which are able to be latched to one another and a cylindrical closure body is displaceably arranged in a support element, joining the shells such that the support elements engage in one another and form a hollow strut penetrating the tank and moving the closure body into a position engaging behind the latching connection.

It is preferably provided that the shells are molded in a molding die and that the support elements are introduced into the shells during, or directly after, the molding.

The shells may be obtained, for example, by injection-molding of thermoplastic material, wherein the support elements are individually injection-molded or welded in a separate operation to the finished shells.

In a particularly expedient and advantageous variant of the method, it is provided that the closure body is moved into the position engaging behind the latching connection by the tank wall being firmly pressed-in and plastically deformed from the outside.

To this end it may be provided, for example, to heat the tank wall and press a punch therein from outside at the corresponding point of the tank wall, so that the tank wall is displaced into the relevant hollow strut, such that it drives the closure body into its position engaging behind the latching connection.

Alternatively, it may be provided that such a deformation of the tank wall has already been undertaken during the molding of the shells, i.e. when said shells are still in the warm plastic state.

If the tank is produced by extrusion blow-molding, it is advantageous for the tank wall to be pressed-in by means of a plunger in the blow-molding die. In this case, the molding of the shells, the introduction of the support elements and the creation of the pressed-in portion take place by utilizing the plasticizing heat of the extruded plastics material.

The tank may, for example, be produced by extrusion blow-molding of a plurality of web-shaped preforms or a tubular preform, which is divided into two webs. The preforms are then able to be applied against the inner contour of a multi-part blow-molding die by applying differential pressure. In the still warm plastic state of the preforms molded on the cavities of the blow-molding die, for example by means of manipulators or by means of a further die part, the parts of the hollow strut on the sides of the shells facing one another or to be turned towards one another are welded at a corresponding point. The parts of the hollow strut are expediently designed so that when the mold die is closed, the sleeve end and the plug end of the hollow strut penetrate one another and produce the latching connection. When the die is closed and the shells are joined together at the corresponding point in the blow-molding die, said shells also being welded together at the edge, a plunger or ram is extended which presses the tank wall of a shell into the hollow strut. The closure piece movably mounted in the hollow strut in the form of a cylinder or piston is in this case pressed further into the hollow strut by the wall material displaced into the interior of the hollow strut, until the closure body is located in the position securing the latching connection. At this point it should be noted that both the hollow strut and the closure body do not necessarily have to have a round cross section.

The pressed-in portion of the tank wall which has been produced in this manner remains on the finished tank. After complete solidification of the material, the position of the closure body is finally set.

As already mentioned above, the tank may have been obtained from a single- or multi-layer extrudate of thermoplastic material based on HDPE. The tank may have barrier properties for hydrocarbons, oxygen or the like. The invention is described hereinafter with reference to an exemplary embodiment, in which:

FIG. 1 shows a rough schematic view of the tank according to the invention,

FIG. 2 shows a partial section through a hollow strut inside the tank in the non-locked state and FIG. 3 shows a partial section through a hollow strut of the tank according to the invention in the locked state.

As already mentioned above, the tank 1 according to the invention may, for example, be provided as a fuel tank for a motor vehicle with the usual fittings therefore. The tank 1 shown in FIG. 1 is shown schematically in a very simplified manner. The tank 1 consists of thermoplastic material in one piece and may have any contour, in particular a filler pipe and discharge openings, which for the sake of simplicity are not shown. The tank wall 2 of the tank 1 comprises two opposing large-surface wall regions 3*a* and 3*b* as well as two opposing small-surface wall regions 3*c* and 3*d*.

The term "integral" in the sense of the present invention does not exclude the fact that the tank is made up of two complementary shells. It is possible for said shells to have been completely welded together at the edge on a peripheral flange, so that the tank is substantially closed and formed in one piece.

The tank 1 according to the invention has preferably been obtained by extrusion blow-molding, for example by means of a method as described in DE 10 2006 031 902 A, reference being made here to the full contents thereof for the purpose of the disclosure of the invention.

As may be derived from FIG. 1, the opposing large-surface wall regions 3*a*, 3*b* of the tank 1 are supported against one another by means of a hollow strut 4.

The term "hollow strut" in the sense of the present invention is to be understood that the strut is at least partially hollow.

The hollow strut 4 is made up of two parts 4*a* and 4*b*, wherein each part of the hollow strut 4*a*, 4*b* has a base 5 connected to the tank wall 2 by a material and/or positive connection.

As has already been mentioned above, the parts of the hollow strut 4*a*, 4*b* have been attached and/or molded onto the tank wall 2 directly after the molding of preforms of thermoplastic material to form shells in a blow-molding die 6.

FIGS. 2 and 3 show in each case partial sections of the tank 1 inside the blow-molding die after which the parts of the hollow strut 4a, 4b in the region of the base 5 have been connected to the still-warm plastic tank wall 2 in the blow-molding die 6, and the blow-molding die 6 has been closed so that the ends of the parts of the hollow strut 4a, 4b remote from the base 5 engage in one another and are latched together.

A part 4a of the hollow strut is provided with a widened sleeve end 7, whereas the other part is provided with a plug end 8 complementary thereto.

In order to be able to provide the hollow strut 4 with approximately the same diameter overall, the sleeve end 7 is widened relative to the remaining cross section, but the plug end 8 is tapered relative to the remaining cross section so that the diameter steps/shoulders 9 provided in the sleeve end 7 and in the plug end 8 in each case form stops which bear against one another in the latched state.

In the plug end 8 a plurality of latching springs 10, which are able to be pressed-in, are preferably provided and which in the locked state spring back and snap into corresponding latching recesses 11 of the sleeve end 7.

A closure body 12 in the form of a cylinder is displaceably arranged inside the part 4b of the hollow strut. The closure body 12 is also stepped in diameter, wherein one end of the closure body 12 corresponds to the internal diameter of the plug end 8 and a diameter of the closure body 12 is slightly smaller than the internal diameter of the remaining cross section of the hollow strut.

As already mentioned, FIG. 2 shows the latched state of the hollow strut 4, wherein the closure body 12 is in its initial position, in which the latching of the hollow strut 4 is not locked. At 13, a plunger is denoted in the blow-molding die 6, said plunger being shown in FIG. 3 in its position extended from the wall of the blow-molding die 6. In this position, the plunger 13 displaces the material of the tank wall 2 into the cross section of the part 4d of the hollow strut open toward the tank wall 2, such that the indentation thus formed on the outside in the tank wall 2 displaces the closure body 12 axially relative to the fixed hollow strut 4.

The guiding end of the closure body of reduced diameter, as regards the movement of the closure body 12, penetrates the plug end 8 of the part 4b of the hollow strut of reduced diameter so that the closure body 12 comes into abutment in a position in which the region of greater diameter of the closure body 12 engages behind the latching springs 10. The latching springs 10 are secured in a position in which a pressing-in and, as a result, a release is no longer possible.

In the position shown in FIG. 3, after finishing the tank 1, the tank wall 2 is solidified so that the closure body 12 permanently remains in the position shown there.

The essential advantage of the invention is in the supporting function of the latching springs from inside. As a result, the mechanical stability of the latching may be markedly increased. In particular, when the tank according to the invention has been produced as a fuel tank with a multi-layer tank wall with barrier layers for hydrocarbons, the stabilizing of the tank according to the invention by means of two-part hollow struts provides a simple option to increase the mechanical stability of the tank, without negatively influencing the permeation property of the multi-layer system. In particular, creep of the latching springs or other latching hooks as a result of fuel swelling and the effects of temperature is considerably reduced and/or completely eliminated.

A particularly preferred application of the tank is, for example, an application as a pressurized tank in a petrol hybrid vehicle.

Naturally, the tank according to the invention may have one or more struts/hollow struts provided at any point, which are secured in a corresponding manner between the wall regions of the tank wall 2.

LIST OF REFERENCE NUMERALS

1 Tank
2 Tank wall
3a, b Large-surface wall regions
3c, d Small-surface wall regions
4 Hollow strut
4a, b Parts of the hollow strut
5 Base
6 Blow-molding die
7 Sleeve end
8 Plug end
9 Shoulders
10 Latching springs
11 Latching recesses
12 Closure body
13 Plunger

What is claimed is:

1. A tank for a motor vehicle which is made up of two shells which are complementary to one another, wherein the shells are supported against one another by at least one strut penetrating the tank, connecting opposing wall regions of the tank, the strut is configured as a hollow strut, the hollow strut being configured in two parts, the parts of the hollow strut being latched together via a plug connection and the latching connection being secured by at least one closure body.

2. The tank as claimed in claim 1, characterized in that in a secured position the closure body at least partially fills up the cross section of the hollow strut, at least level with the latching connection.

3. The tank as claimed in claim 1, characterized in that the shells and the hollow struts consist of thermoplastic material.

4. The tank as claimed in claim 1, characterized in that the parts of the hollow strut in each case are welded and/or riveted to the wall of the associated shell.

5. The tank as claimed in claim 1, characterized in that the parts of the hollow strut have a sleeve end and a plug end which are latched into one another.

6. The tank as claimed in claim 5, characterized in that at least one latching spring is provided on the plug end, said latching spring engaging in a correspondingly configured latching recess of the sleeve end.

7. The tank as claimed in claim 6, characterized in that the closure body holds the latching spring in an extended position, in which the latching spring engages in an associated latching recess.

8. The tank as claimed in claim 1, characterized in that the closure body is configured as a cylinder which engages behind the latching connection in a locked position.

9. A method for producing a tank for a motor vehicle, characterized in that the tank is made up of two shells which are complementary to one another, wherein the shells are supported against one another by at least one strut penetrating the tank, connecting opposing wall regions of the tank, the strut is configured as a hollow strut, the hollow strut being configured in two parts, the parts of the hollow strut being latched together via a plug connection and the latching connection being secured by at least one closure body, and characterized by the following method steps:

producing the two shells from thermoplastic material, introducing fittings in the form of hollow support elements into the shells such that in each case said hollow support elements are connected by a material and/or positive connection to the shells, wherein the support elements in each case have complementary plug ends which are able to be latched to one another and a cylindrical closure body is displaceably arranged in a support element, joining the shells such that the support elements engage in one another and form the hollow strut penetrating the tank and moving the closure body into a position engaging behind the latching connection.

10. The method as claimed in claim 9, characterized in that the shells are molded in a molding die and in that the support elements are introduced into the shells during, and directly after, the molding.

11. The method as claimed in claim 9, characterized in that the closure body is moved into the position engaging behind the latching connection by the tank wall being firmly pressed-in and plastically deformed from the outside.

12. The method as claimed in claim 11, characterized in that the tank is produced by extrusion blow-molding and in that the tank wall is pressed-in by means of a plunger in the blow-molding die.

13. The method as claimed in claim 12, characterized in that the molding of the shells, the introduction of the support elements and the creation of the pressed-in portion take place by utilizing the plasticizing heat from the extruded plastics material.

14. The tank as claimed in claim 1, characterized in that the tank is a fuel tank.

15. The tank as claimed in claim 1, characterized in that the tank is an auxiliary fluid tank.

* * * * *